United States Patent [19]

Gräbner et al.

[11] Patent Number: 4,731,694

[45] Date of Patent: Mar. 15, 1988

[54] TOUCH SELECTION PAD AND METHOD OF MANUFACTURE

[75] Inventors: Günther Gräbner, Heroldsbach; Dietrich Stephani, Erlangen, both of Fed. Rep. of Germany

[73] Assignee: Siemens Aktiengesellschaft, Munich, Fed. Rep. of Germany

[21] Appl. No.: 40,239

[22] Filed: Apr. 20, 1987

[30] Foreign Application Priority Data

May 5, 1986 [DE] Fed. Rep. of Germany ....... 3615204
Dec. 15, 1986 [DE] Fed. Rep. of Germany ....... 3642780

[51] Int. Cl.$^4$ ..................... H01H 9/00; H01H 13/02; H02P 7/00
[52] U.S. Cl. .................................. 361/280; 29/25.42; 200/DIG. 1; 340/365 C
[58] Field of Search ....................... 361/320, 321, 280; 200/DIG. 1; 29/25.42; 307/116; 340/365 C; 338/22

[56] References Cited

U.S. PATENT DOCUMENTS

| | | | |
|---|---|---|---|
| 3,124,772 | 3/1964 | Newkirk | 338/22 R |
| 3,503,031 | 3/1970 | Nyhus et al. | 200/DIG. 1 X |
| 3,641,410 | 2/1972 | Vogelsberg | 200/DIG. 1 X |
| 4,367,385 | 1/1983 | Frame | 340/365 C |
| 4,415,781 | 11/1983 | Frame et al. | 200/DIG. 1 X |

*Primary Examiner*—Donald A. Griffin
*Attorney, Agent, or Firm*—Kenyon & Kenyon

[57] ABSTRACT

A touch selection pad contains a matrix of tactile sensors each of which contains a composite material with a pressure and direction-dependent electric conductivity and a dielectric material forming a capacitor. These are provided with column electrodes and row electrodes. When touched, each of the sensors creates a series circuit comprising a resistor formed of the composite material and a capacitor formed from the dielectric having a capacitance of preferably at least 50 pF. In this matrix of tactile sensors, the pressure-dependent resistance together with the associated fixed capacity serves as the measuring variable. The touch pad due to the small spacing between the sensors has a high resolution. It can be produced in a simple manner by sequentially depositing layers on a metalized carrier by means of a thin-film technique. The row and column electrodes can be etched out of a metalized plastic cover layer and a metalized carrier, respectively, by micro structuring techniques.

24 Claims, 7 Drawing Figures

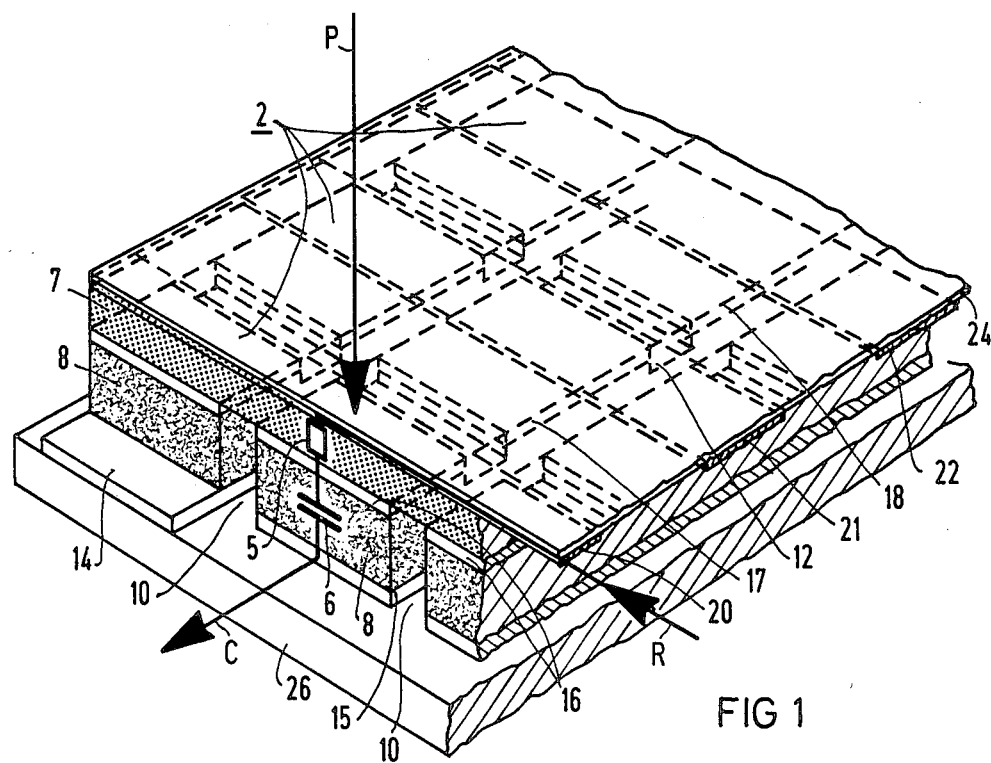
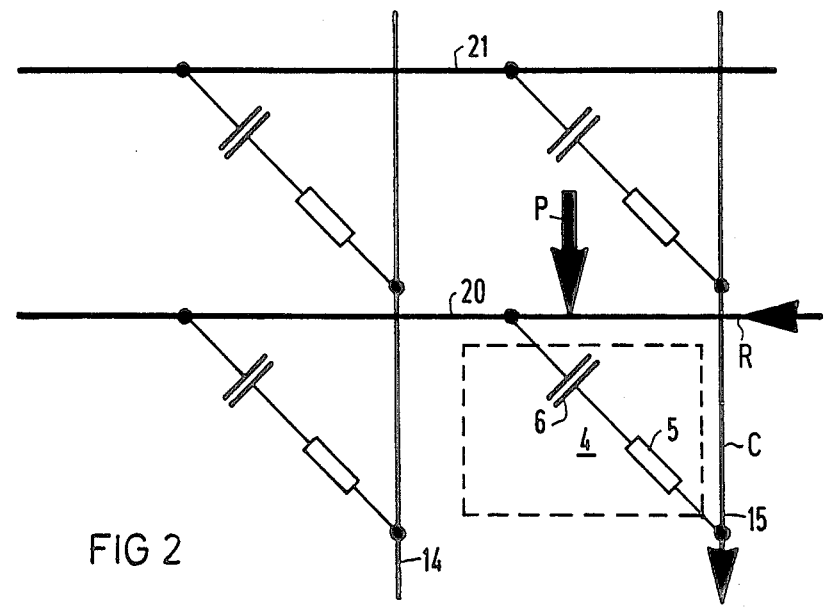

TOUCH SELECTION PAD AND METHOD OF MANUFACTURE

BACKGROUND OF THE INVENTION

1. Technical Field

The invention relates to the field of touch selection pads having a matrix of tactile sensors, and, more particularly, to one containing a composite material having an electric conductivity which varies in response to application of pressure in a predetermined director.

2. Description of The Prior Art

Touch selection pads are known from the field of design of telephone station apparatus, household appliances computers and the like which comprise a matrix of individual tactile sensors having varying electrical conductivity when touched. Materials with pressure-dependent electrical resistance are known, the electric conductivity of which inoreases with increasing tactile pressure. At least one such known material contains an electrically conductive plastic, such as silicone rubber, with embedded electrically conducting particles in finely distributed form, that can be used to form the tactile sensors. The dimension of the conducting particles is generally about 0.15 to 0.2 mm and they fill about 15 to 20 percent of the total volume of the material. The pressure-dependent electric conductivity is due to the formation of current paths when the material is touched resulting in a corresponding increase in the number of metallic contacts at the pressure points. In an untouched state, this material has a relatively high resistance and for all practical purposes acts as an insulator.

A known matrix comprises sensors formed of this composite material with an average spacing between the sensors of about 1 mm. This matrix comprises an electrical conductor terminal with pairs of terminals each terminating a pair of electric wires. The known matrix is further provided with a plastic covering and a perforated plate containing a hole for each sensor in which a contact pin is arranged for each hole. The design of this touch pad is therefore relatively complicated. In addition, this touch pad having purely resistive evaluation requires a decoupling diode for each sensor for alleviating noise and crosstalk.

In another known tactile sensor matrix, a foil of electrically conductive rubber is provided, the electric resistance of which decreases with increasing pressure. This rubber foil with a thickness of about 24 um is provided on one flat side with parallel-arranged row electrodes and on its opposite flat side with parallel-arranged column electrodes and between which electrodes strip-shaped spacers are provided. The crossings of the row and column electrodes form a matrix of sensors. Row and column conductors are associated with the electrodes for sensing the status of the matrix crosspoints. The pressure dependence of the material, however, varies over the entire surface of the foil. The measured resistance values are therefore not accurately reproducible for a particular pressure load, and a correspondingly large scattering of the measured values is thus obtained. To compensate for this variation in signal levels depending on the particular selection of rows and columns, a relatively costly electronic circuit is therefore necessary.

Consequently, the touch selection pads of the prior art tend to be complicated by additional electronic circuitry to distinguish true touches or, if the touch pad arrangements are simplified, they tend to experience noise or crosstalk problems.

SUMMARY OF THE INVENTION

The problems and related problems of prior art touch pad arrangements are overcome by the provision of a bottom dielectric layer that is covered by a layer of composite material of variable conductivity. The dielectric layer has a capacitance which exceeds fifty picofarads and thus compensates for the unpredictable measured signal levels obtained when a variable conductivity layer is used alone. As a result, the output signals of the sensors are largely independent of the resistance of the composite material over a wide range. The capacity of the dielectric layer remains practically unchanged when the sensor is touched, and the varying resistance has only small influence on the measuring result. The thickness and the material of the dielectric are chosen so that the capacitance does not fall substantially below a predetermined limit of about 10 picofarads and is preferably substantially more than 50 picofarads and in particular is at least 500 picofarads.

If a dielectric material is chosen with a dielectric constant r of at least 1000, a large value capacitor can thereby be realized in a relatively small space. During interrogation of a touched sensor, the capacitive reactance should be distinctly larger than the resistive component of the total impedance. The capacitive reactance of this capacitor coupled with the variable resistance, thus has a substantial effect on the measurement result. A ceramic body, for instance, can be provided as the dielectric layer. Its upper and lower surfaces face the row or column electrodes respectively. Both surfaces of the dielectric layer are metalized. The metallized layer between the capacitor thus formed and the variable resistance can preferably be separated by grooves. During manufacture of the touch pad, the dielectric layer can then be physically separated along with its metallization into strips and fastened on a carrier. The metal strips on the bottom surface of the dielectric layer then form the columnar electrodes of the touch pad matrix. Similarly, the top surface of the composite material can be metalized and physically separated by transverse grooves, the remaining metalized strips forming the row electrodes.

In a particularly advantageous method for manufacturing the present touch pad, the carrier with the strip-shaped column electrodes as well as the correspondingly strip-shaped dielectric is produced as a common structural unit. The material for the electrodes and the dielectric are successively applied by a thin-film technique to the carrier as a coating and, subsequently, the strip-shaped electrodes with the associated dielectric are etched out from the coating by photo lithography. In this embodiment, a dielectric with a relatively small dielectric constant can be chosen since a correspondingly high capacity is obtained by the very small thickness of the dielectric which does not substantially exceed a few um and can, in particular, be substantially smaller than 1 um.

On top of the dielectric layer is placed the composite layer which should have a high tensile strength. The upper row electrodes are then deposited on the composite layer and severed as described above. Alternatively, the row electrodes are deposited and etched out of a plastic cover layer covering the composite layer. In either case, the upper row electrodes are arranged at right angles to the lower column electrodes. Between the row electrodes and the associated variable resistance of the sensors, a positive force transmitting connection then exists.

BRIEF DESCRIPTION OF THE DRAWINGS

FIG. 1 is a perspective, partially cut-away view of a touch selection pad according to the present invention;

FIG. 2 is an equivalent circuit diagram of part of the present arrangement according to FIG. 1;

DETAILED DESCRIPTION

Figure 3:
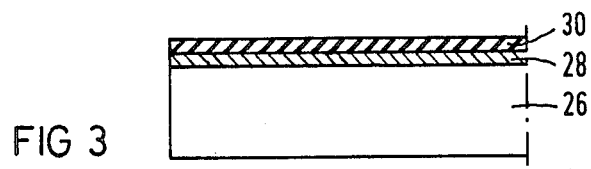
FIGS. 3 to 6 are side views showing a coating and photolithographic process of manufacturing the touch pad of FIG. 1.

Referring to the perspective view according to FIG. 1, a touch selection pad contains a matrix of tactile sensors 2, each of which contains a series electrical circuit 4 (See FIG. 2) of a resistance 5 which varies by pressure and a capacitor 6. The variable resistance 5 is formed by the part of a foil 7 respectively associated with one of the sensors with a thickness of, for instance, about 0.5 mm of a composite material having a pressure-dependent electric conductivity. In the direction of a pressure load indicated by arrow P, the capacity 6 of a dielectric layer 8 is connected in a series with the variable resistance 5 of the composite material 7.

In one embodiment, the capacitor 6 can be formed by a ceramic body which may consist, for instance, of barium titanate $BaTiO_3$ which has a high dielectric constant $\epsilon_r$ of preferably at least 3,000 and a thickness of, for instance, about 0.5 mm, the bottom side of which is metalized. The ceramic body is separated by longitudinal grooves 10 of which only two are visible in FIG. 1. These longitudinal grooves 10 also separate the metalized bottom side such that long, strip-shaped column electrodes, 14 and 15, respectively, are formed. With each strip-shaped electrode 14, 15, there is associated a strip-shaped dielectric 8.

Under some circumstances, it may also be advantageous to metalize the ceramic body on its upper flat side as well. In this case, the upper metallization of the dielectric 8 is separated by transverse grooves 12 into metallic spacers, 16 to 18, one for each of the sensors 2. These metallic spacers 16 to 18 act as electric equipotential surfaces, that is, as soon as one of the touch surfaces of the touch pad is touched, the entire electrode area is activated.

A covering 24 of plastic is provided on its bottom side with strip-shaped electrodes 20, 21, 22 which, with the column electrodes 14 and 15, form an angle, preferably a right angle. Electrodes 20, 21, 22 serve as row electrodes for the tactile sensor matrix. Plastic covering 24 of the touch pad consists of a plastic having a high tensile strength, preferably a thermo-stable polyimide, known commercially in Germany as Capton. Between the row electrodes 20 to 22 and the column electrodes 14 and 15 is thus connected a series circuit of the variable resistor 5 and the at least approximately constant capacity 6 of one of the sensors 2. With a width of the row electrodes 20 to 22 a width of the column electrodes 14 and 15 a width of the longitudinal slot 10 and a width of the transverse slot 12 of all, for instance, approximately 0.5 mm, there is provided a matrix of sensors 2 with a sensor to sensor distance of about 1 mm and a correspondingly high resolution for the entire touch pad. A signal can be registered by way of pressure arrow P via the row electrode 20 and read-out by the column electrode 14, as shown in the figure by arrows R and C.

The column electrodes 14 and 15 are fastened to a carrier 26, the dielectric constant of which is preferably substantially smaller than the dielectric constant of the dielectric layer 8. A suitable carrier material is, for example, plastic, preferably tetrafluoroethylene (known commercially as Teflon material and manufactured in the United States by E.I. Dupont de Nemours of Wilmington, Del.) or also polymethylmethacrylate (known commercially as Plexiglas material and manufactured in the United States by Rohm and Haas Company of Philadelphia, Pa.)

The entire touch pad can preferably also be provided with a cover, not shown in the figure, which at the same time serves as a buffer for mechanical shock stresses to the pad. This action as a shock absorber is at the same time aided by the elastic composite material 7. The row electrodes 20 to 22 consist of metal, preferably gold, with a thickness of, for instance, about 20 to 40 um, and are generally vapor-deposited or sputtered on a separate adhesion layer which can consist, for instance, at least in part of chromium. The row electrodes 20 to 22 are coupled to the composite material 7.

In a special embodiment of the touch pad, the covering 24 is metalized on its upper flat side and is electrically grounded. In this manner, the metalization is effective as a shield.

With, for instance, sixteen row conductors 20 to 22 and thirty-two column conductors 14 and 15 and a sensor to sensor spacing of sensors 2 of, for instance about 1 mm, a touch sensitive matrix with 512 sensors is obtained, the switching threshold of which can be, for instance, approximately 0.05 N/pixel in the embodiment shown.

Referring to FIG. 2, there is shown an equivalent circuit diagram for the embodiment of FIG. 1. Only the column electrodes 14 and 15 and the row electrodes 20 and 21 are indicated schematically. These form at every crossing, not specifically shown, one sensor 2, each of which sensors forms a series circuit 4 of a variable resistance 5 and a capacitor 6. In an unloaded condition of the touch pad, the resistance of the composite material 7 in each of the sensors 2 can be, for instance, about ten megaohms and thus can act practically as an insulator. The dielectric 8 is designed so that in each of the sensors 2, a capacity of at least ten picofarads, preferably at least 50 picofarads, and in particular, at least five hundred picofarads is generated. In the unloaded condition, practically no current flows through the sensors 2. If the series circuit 4 of the resistor 5 and the capacitor 6 is loaded by the force vector P, the value of the resistance 5 decreases to at most still about 1 Kohm, and preferably to less than 0.1 Kohm, and a signal is generated which can be detected at the column electrode 15 when interrogated via the row electrode 20. In this arrangement the capacitive effect predominates substantially so that a design of the external wiring, not shown in the figure, is possible as in a purely capacitive circuit, as long as the magnitude of the capacitive reactance is distinctly larger than the resistance of the loaded composite material 7.

Figure 4:
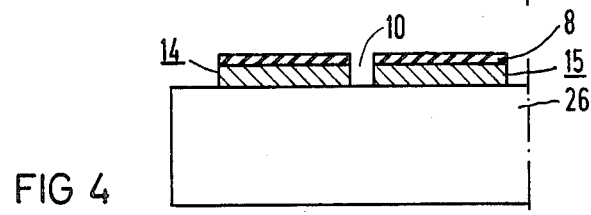
Figure 5:
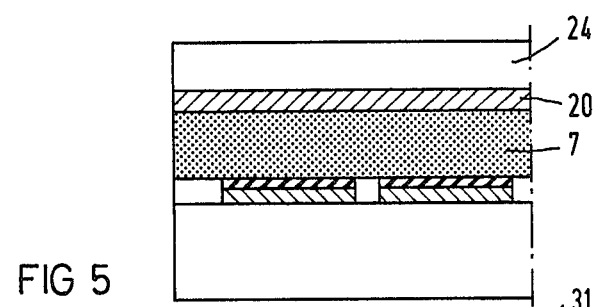

Referring to FIGS. 3–7, a method of manufacturing the present touch pad will now be described. In particular, FIGS. 3–5 show one such method, FIG. 6, a variation of the method of FIGS. 3–5, and FIG. 7 a finished product of the method suggested by way of FIG. 6.

Referring to FIG. 3 a metal layer serving as the conductor layer 28 with a thickness of preferably at most 1000 nm and in particular at most 200 nm is applied by a thin-film technique on the carrier 26, which may consist of nickel, gold, silver or, preferably copper. From this conductor layer 28, longitudinal slots are then etched out by a microstructure technique, for instance, by photo lithography. Strip-shaped regions are formed thereby which act as column electrodes. These column electrodes are then provided with a dielectric covering layer 30 by a thin-film application technique.

The dielectric layer 30 is applied to the conductor layer 28 as shown in FIG. 3. By way of varying the thin film application technique, the dielectric material and thickness are particularly chosen so that a capacity as large as possible is produced. For example, this layer 30 can consist of ceramic, for instance, aluminum oxide $Al_2O_3$ or of titanium oxide $TiO_2$, the dielectric constant of which is maximally about 50. The thickness of this titanium oxide layer should preferably be at most 1000 nm and particularly at most 500 nm. The dielectric layer 30 may also consist preferably of silicon oxide, SiO or $SiO_2$, with a very small thickness of preferably at most 300 nm and, in particular, at most 100 nm which is applied particularly easily by thin-film techniques. In summary then, the material comprising dielectric layer 30 should be selected so that it may be applied by a thin-film technique and should in addition be capable of being processed by methods of microstructure technology as will be now described.

An alternative to covering the column electrodes with a covering of dielectric is to form the dielectric and metalized layer together first and then physically sever both by photolithography.

Referring to FIG. 4, into the layered coverings of the so prepared carrier 26, the longitudinal grooves 10 are then etched out by a microstructure technique, for instance, photo lithography. Strip-shaped regions are formed thereby which respectively act as column electrodes 14 and 15 and with which a very thin dielectric 8 is associated which is likewise strip-shaped. Thus, a common structural unit is formed first by the substrate 26, the column electrodes 14 and 15 and the dielectric 8.

Referring to FIG. 5, the composite material 7 is then placed on the dielectric material 8 as in the embodiment according to FIG. 1. The upper flat side of the composite material 7 has the row electrodes 20 which are preferably formed on the lower flat side of the covering 24.

Figure 6:
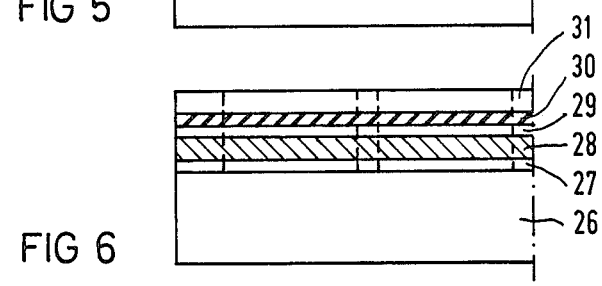

In the manufacture of an alternative embodiment of a touch pad, there is shown in FIG. 6, a metal layer serving as an adhesion layer 27 with a thickness of preferably at most 50 nm. This is applied to the substrate 26 by a thin-film technique, preferably by sputtering or vapor deposition. Adhesion layer 27 consists, for instance, of chromium or preferably of titanium. To this metalic adhesion layer 27 is applied the electric conductor layer 28 which is then preferably provided again with an adhesion layer 29. This adhesion layer 29 is then covered with the layer 30 for the dielectric. In some circumstances it may be advantageous to provide the dielectric layer 30 with a thin metal covering 31. This metal layer is then severed by microstructuring, as is indicated by dashed lines in the figure.

Figure 7:
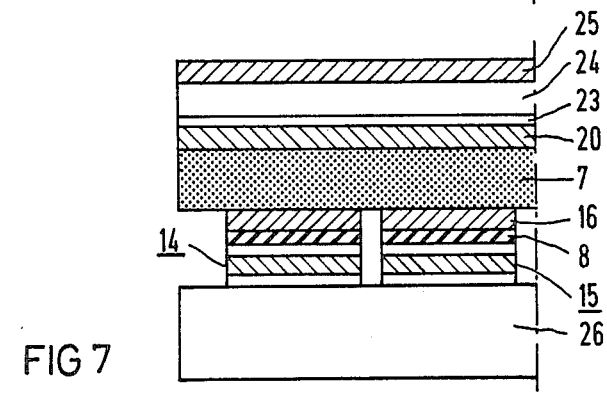
FIG. 7 shows a finished touch pad manufactured according to the process shown in FIG. 6 in side view.

In the embodiment according to FIG. 7, the structural unit formed in accordance with FIG. 6 consisting of the substrate 26, the column electrodes 14 and 15 and the dielectric 8 is provided with the plastic covering 24. This covering 24 is already provided on its lower flat side with the row electrodes 20 and on its upper flat side with a metallic shielding layer 25. An adhesion layer 23 separates the row electrodes 20 from the covering 24. Adhesion layer 23 may consist, for example, of chromium. The individual metallic regions 16 serve as electric equipotential surfaces in the touch pad between the dielectric 8 and the composite material 7.

What is claimed is:

1. A touch selection pad comprising:
   (a) a matrix of tactile sensors arranged into rows and columns, each tactile sensor comprising a series circuit of a variable resistance which is part of a layer of composite material which has a pressure dependent conductivity and a capacitor comprising a layer of dielectric material having a capacitance of at least fifty picofarads;
   (b) a plurality of row electrodes coupled to the rows of the matrix of tactile sensors and
   (c) a plurality of column electrodes coupled to the columns of the matrix of tactile sensors.

2. The touch selection pad according to claim 1, wherein the capacitance of the capacitor of the dielectric material is at least five hundred picofarads.

3. The touch selection pad according to claim 1, wherein the dielectric material has a dielectric constant of at least 1000.

4. The touch selection pad according to claim 3, wherein the dielectric material comprises ceramic material, formed into strip-shaped bodies arranged between the column electrodes and the composite material.

5. The touch selection pad according to claim 1, wherein the dielectric material has a flat metalized side, the column electrodes being formed by mechanically severing the metalization of the metalized flat side of the dielectric material.

6. The touch selection pad according to claim 1, wherein the dielectric material has a flat metalized side facing the composite material, the metalization of the flat metalized side of the dielectric material being mechanically severed, the severed metalized side of the dielectric material forming strip-shaped metallic spacers between the composite material and the dielectric material.

7. The touch selection pad according to claim 1, wherein the composite material has a flat side, and wherein the row electrodes are strip-shaped and coupled to the flat side of the composite material, an electrically insulating covering covering the strip-shaped row electrodes and exposed portions of the flat side of the composite material.

8. The touch selection pad according to claim 7, wherein the electrically insulating covering has a flat side facing away from the strip-shaped row electrodes and the flat side of the composite material, the flat side of the electrically insulating covering being metalized, with the metalized flat side of the covering being electrically grounded.

9. A method of manufacturing a touch selection pad on a carrier comprising a matrix of tactile sensors arranged into rows and columns, a plurality of row electrodes coupled to the rows of the matrix of tactile sensors and a plurality of column electrodes coupled to the columns of the matrix of tactile sensors, comprising the steps of:
   (a) metalizing a carrier using thin-film metalization processes;
   (b) etching grooves into the metalization of the metalized carrier to form the column electrodes;

(c) applying a dielectric material as a layer over the remaining metalized portions of the carrier by thin film application processes;
(d) covering the dielectric material layer with a composite material;
(e) forming an electrically insulating covering having a flat side;
(f) applying the row electrodes to said covering; and
(g) covering the composite material with the flat, row electrode side of the electrically insulating covering.

10. The method of manufacturing a touch selection pad according to claim 9, wherein the formation of column electrodes occurs after the application of the dielectric layer of the carrier such that the grooves are etched through both the dielectric material layer and the metalization of the metalized carrier forming strip-shaped column electrodes and corresponding strip-shaped dielectric material regions.

11. The method of manufacturing a touch selection pad according to claim 10, wherein, after the dielectric material layer is applied to the carrier, the dielectric material layer is metalized, and the formation of column electrodes is performed after the formation of the dielectric material layer and its metalization such that the grooves are etched through the metalized dielectric material layer and the metalization of the metalized carrier forming strip-shaped column electrodes and corresponding metalized strip-shaped dielectric material regions.

12. The method of manufacturing a touch selection pad according to claim 11, wherein the metalization of the dielectric material layer occurs after the application of an electrically conducting adhesion layer to the dielectric material layer such that the metalization of the dielectric material layer is of the electrically conducting adhesion layer applied to the dielectric material layer.

13. The method of manufacturing a touch selection pad according to claim 10, wherein the metalizing of the carrier comprises metalizing with copper.

14. The method of manufacturing a touch selection pad according to claim 10, wherein the metalizing of the carrier forms a conductive layer having a maximum thickness of one micrometer.

15. The method of manufacturing a touch selection pad according to claim 10, wherein the dielectric material layer comprises titanium dioxide.

16. The method of manufacturing a touch selection pad according to claim 15, wherein the titanium dioxide dielectric material layer has a maximum thickness of five hundred nanometers.

17. The method of manufacturing a touch selection pad according to claim 10, wherein the dielectric material layer comprises an oxide of silicon.

18. The method of manufacturing a touch selection pad according to claim 17, wherein the oxide of silicon layer of dielectric material has a maximum thickness of one hundred nanometers 19. A method of manufacturing a touch selection pad according to claim 9 wherein the metalization of the carrier is performed after an electrically conducting adhesion layer is applied to the carrier such that the metalization of the carrier is of the electrically conducting adhesion layer applied to the carrier.

20. The method of manufacturing a touch selection pad according to claim 19, wherein the electrically conducting adhesion layer is applied to the carrier by sputtering.

21. The method of manufacturing a touch selection pad according to claim 19, wherein the electrically conducting adhesion layer is applied to the carrier by vapor deposition.

22. The method of manufacturing a touch selection pad according to claim 19, wherein the electrically conducting adhesion layer comprises titanium.

23. The method of manufacturing a touch selection pad according to claim 19, wherein the electrically conducting adhesion layer comprises chromium.

24. The method of manufacturing a touch selection pad according to claim 19 wherein the electrically conducting adhesion layer is applied to the carrier to a maximum thickness of fifty nanometers.

* * * * *